United States Patent [19]
Gregoire

[11] Patent Number: 5,692,414
[45] Date of Patent: Dec. 2, 1997

[54] FLYWHEEL HAVING REDUCED RADIAL STRESS

[75] Inventor: Daniel J. Gregoire, Thousand Oaks, Calif.

[73] Assignee: Hughes Aircraft Company, Los Angeles, Calif.

[21] Appl. No.: 370,777

[22] Filed: Dec. 23, 1994

[51] Int. Cl.$^6$ .............................................. F16F 15/305
[52] U.S. Cl. .............................................. 74/572
[58] Field of Search .................. 74/572; 310/74; 428/64, 65, 66; 301/64.7; 295/8; 464/181, 902

[56] References Cited

U.S. PATENT DOCUMENTS

| | | | |
|---|---|---|---|
| 3,978,256 | 8/1976 | James | 428/66 |
| 4,030,754 | 6/1977 | Merlette | 301/64.7 |
| 4,036,080 | 7/1977 | Friedericy et al. | 74/572 |
| 4,080,845 | 3/1978 | Hatch . | |
| 4,179,951 | 12/1979 | Theyse . | |
| 4,285,251 | 8/1981 | Swartout | 74/572 |
| 4,461,515 | 7/1984 | Gwynette et al. | 301/64.7 |
| 4,721,342 | 1/1988 | Daniels et al. | 301/64.7 |
| 4,832,414 | 5/1989 | Jones | 301/64.7 |
| 4,860,611 | 8/1989 | Flanagan et al. | 74/572 |
| 4,991,462 | 2/1991 | Breslich, Jr., et al. . | |
| 5,285,699 | 2/1994 | Walls et al. | 74/572 |
| 5,452,625 | 9/1995 | Nardone et al. | 74/572 |

FOREIGN PATENT DOCUMENTS

| | | | |
|---|---|---|---|
| 25 40 625 | 3/1977 | Germany . | |
| 26 06 577 | 8/1977 | Germany . | |
| 653455 | 3/1979 | U.S.S.R. | 74/572 |
| 794277 | 1/1981 | U.S.S.R. . | |

OTHER PUBLICATIONS

R. Coco, et al., "*Ball Bearing Applications to a High–Speed Flywheel,*" Flywheel Energy Storage Technology Workshop, Draper Laboratory, Nov., 1993, pp. 1–16.

Primary Examiner—Charles A. Marmor
Assistant Examiner—Mary Ann Battista
Attorney, Agent, or Firm—V. D. Duraiswamy; W. K. Denson-Low

[57] ABSTRACT

A high-speed flywheel includes a composite rim supported for rotation about a central axis which is perpendicular to the plane of the rim. The rim includes at least a pair of rim portions or regions of differing elastic modulus in the circumferential direction of the material forming the rim. Moreover, a radially outer portion of the rim has a higher elastic modulus in the circumferential direction, while a radially inner portion of the rim has a lower elastic modulus in the circumferential direction. This variation of circumferential elastic modulus is achieved by a selected radial variation of the angle of the fiber reinforcement material relative to the circumferential direction of the rim. A result is that the radially inner portion of the rim transfers radial force to the outer portion, with a resulting lower radial stress in the radially inner portion of the flywheel rim. An improved speed of operation and greater energy storage for the flywheel is achieved.

16 Claims, 1 Drawing Sheet

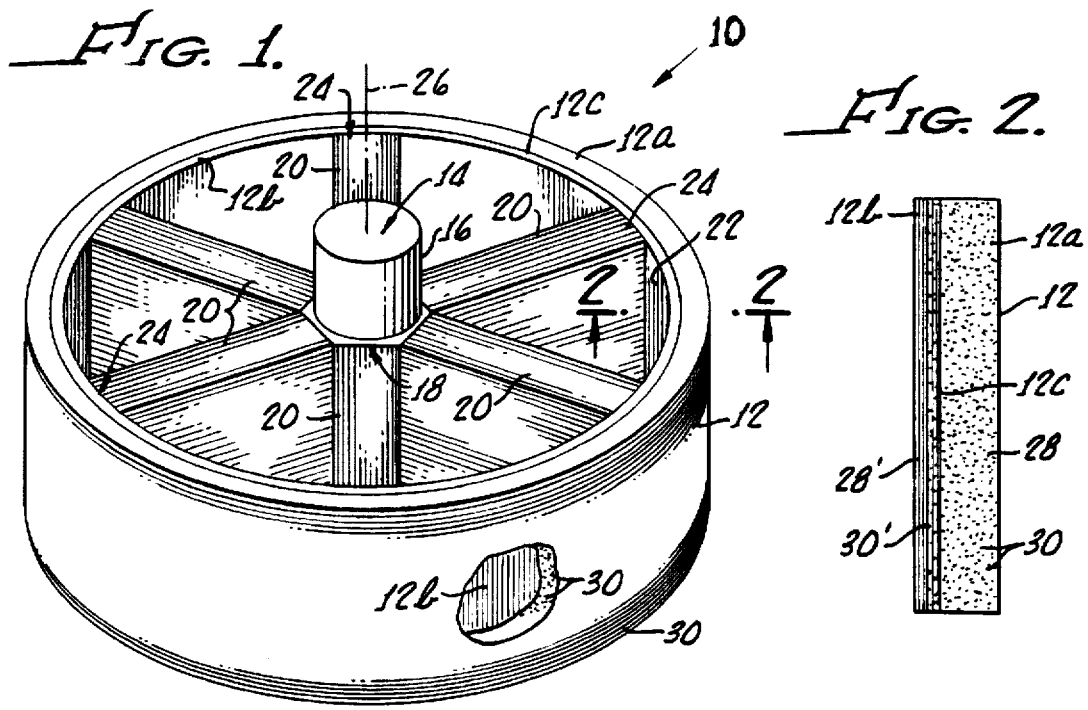
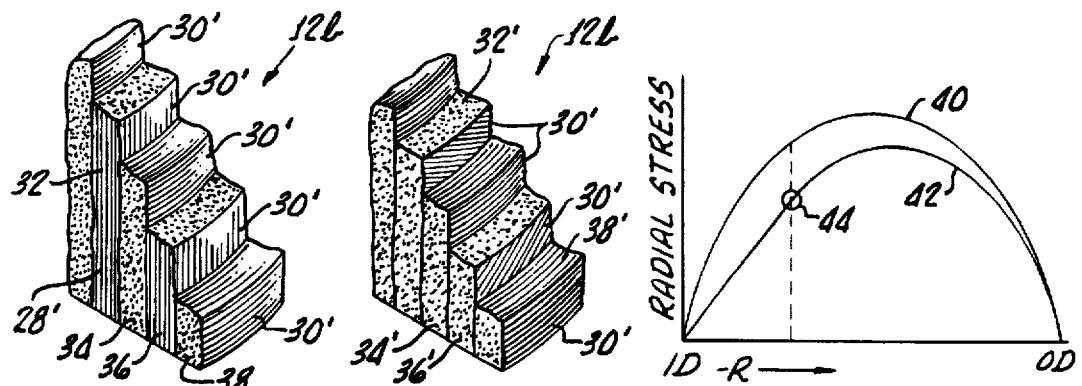
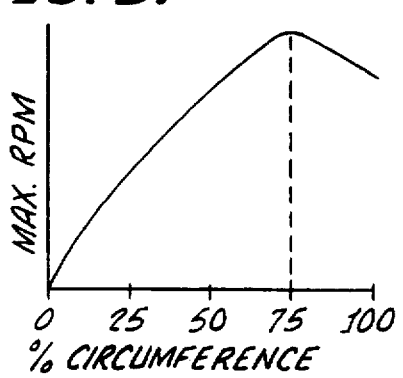
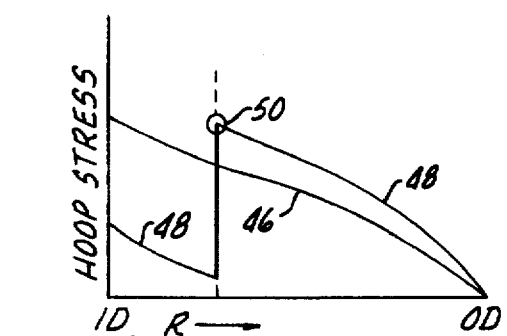

FLYWHEEL HAVING REDUCED RADIAL STRESS

This invention was made with Government support under contract No. F29601-92-C-0124 awarded by the Air Force. The Government has certain rights in this invention.

BACKGROUND OF THE INVENTION

1. Field of the Invention

The present invention relates in general to energy storage flywheels, and more particularly relates to high-speed, high-energy-density flywheels having reduced radial stress. Such flywheels may be configured with an annular rim of high-strength composite material. Typically, this rim is supported upon a hub. The hub may have a radially-extending disk, or one or more radially-extending spokes, for example, supporting the rim from a rotational shaft. Alternatively, some flywheel designs have neither a hub nor a shaft. These alternative flywheel designs magnetically suspend the flywheel rim using magnetic bearings. During operation of a flywheel, centrifugal force imposes both hoop stresses and radial stresses on the rim of the flywheel. In order to withstand these forces, the composite rim may be fabricated to include circumferentially-extending high-strength fibers disposed in a matrix material.

2. Related Technology

Recent efforts at energy conservation as well as general attempts to reduce the use of fossil fuels have led to a re-examination of flywheel energy storage systems. The ability to store mechanical energy using the rotational motion of a flywheel appears to be effective for a wide variety of applications, particularly in vehicular transportation systems.

Flywheels have been used since ancient times for short-term energy storage. They are one of the oldest methods of energy storage known to mankind. For example, in ancient potteries the potter used his foot to rotate a kick wheel coupled by a vertical shaft to his potter's wheel. The rotational inertia of the rotating kick wheel, shaft, and potter's wheel together formed a flywheel system which maintained a somewhat steady rotational speed between kicks of the potter's foot. Flywheels for just the same purpose have been applied in steam and internal combustion piston engines since the development of these power sources. In contrast, the consideration of flywheels for longer-term, high-speed, and high-energy-density storage is much more recent, relying for its technical viability upon developments in materials science and in bearing technology.

Because the moment of inertia of a flywheel is equal to its mass multiplied by the square of the distance between this mass and the center of rotation, traditional flywheels tended to be massive and heavy. When the moment of inertia of a flywheel is large, large amounts of energy will be absorbed or released as the angular velocity of the flywheel changes. Consequently, traditional flywheels have been typically characterized by heavy weights and large moments of inertia. That is, the traditional flywheel may have taken the form of a large cast iron wheel with a heavy rim and spokes connecting the rim to a hub and shaft. Such ordinary metallic-disk flywheels which have been in use for many years. However, these metallic-disk flywheels are hampered by a low energy density of approximately 10–20 watt hours per kilogram. Conventional materials such as cast iron, steel, aluminum, titanium, and other metal alloys are commonly used for metallic-disk flywheels in which stress levels are not too high.

Accordingly, the flywheel provides a conceptually simple and potentially effective means of storing energy for vehicular and other applications. The kinetic energy, W, contained by a rotating flywheel is $\frac{1}{2} I\omega^2$ where I is the moment of inertia of the mass of the flywheel about the center of rotation and $\omega$ is the angular velocity in radians per second. Dividing the energy content of a flywheel rotor by its weight provides the weight energy density of the flywheel. In general, the higher the weight energy density of a flywheel rotor the more attractive the energy storage system will be for mobile applications such as mass transportation buses and automobiles. A similar analysis is conducted with respect to the volume of a flywheel energy storage system in order to give a volume energy density measurement. By mounting the flywheel in a vacuum chamber with low friction bearings, energy losses to windage and mechanical friction are minimized.

Moreover, as is pointed out above, mass alone is not the most important criterion for the "flywheel effect," because the angular velocity squared is involved, while the moment of inertia (or mass) of the flywheel appears with a unity power. Thus, achieving very high rotational speeds for a flywheel become important in order to achieve the most desirable weight and volume energy densities. That is, a small, light flywheel rotating at an extremely high speed can store as much energy as a large, heavy, and slowly rotating flywheel. However, for a vehicular system, it is much more desirable to carry the small, light flywheel rather than a large, heavy one.

At high rotational speeds, the shape of a flywheel body also becomes important in order to control stresses in the flywheel. A variety of high-speed, high weight-energy-density flywheel systems have been tested on a laboratory scale in the past few years. In order to improve the energy density of flywheels, materials of construction having high strength to density ratios are particularly important. For example, to store large quantities of energy in a flywheel of light weight and reasonably small size requires flywheel designs that can spin at speeds of up to 100,000 revolutions per minute (RPM), or higher. At these speeds, the centrifugal force field is sufficiently strong that conventional materials (i.e., wood, stone, cast iron, and virtually all other metallic materials) become unusable because the ratio of their strength to density is too low. Consequently, attention has been directed to forming flywheels of high-strength lightweight composite materials.

In particular, recent attention has been directed to the use of flywheels as devices for energy storage in mass transportation vehicles, such as urban buses, operating under stop-and-go conditions. For example, while a bus is stopped, a flywheel energy storage system (FWES) aboard the bus may be charged with energy by bringing the rotational speed of its flywheel to a high level. This energy charging might be accomplished by connecting the vehicle to a road-side power buss, or to overhead wires provided at stops for the vehicle. An electric motor aboard the bus would spin up the flywheel during stops, drawing energy from the urban electrical power grid. Energy is then drawn from the flywheel by operating the electric motor as a generator providing electric power to a electric traction motor of the bus. Thus, the bus is accelerated and powered it toward its next stop. As the bus slows for its next stop, the traction motor operates as a generator, braking the bus and returning energy to the flywheel. While final stopping of the bus would probably be accomplished with conventional brakes, most of the energy in the momentum of the bus would be conserved. Consequently, a very energy-efficient hybrid-electric mass transportation urban bus facility may be provided. Similar systems have been investigated for use in smaller individual or family transportation units similar to today's automobile.

Composite materials for use in such high-energy flywheels use two or more distinct substances, such as glasses, ceramics, or polymers combined to produce a material with structural or functional characteristics different from the individual constituents. The constituents retain their individual characteristics and are distinguishable on a microscopic scale. Typically one constituent is classified as the reinforcement and the other as the matrix. The reinforcement generally provides the strength or stiffness in the composite while the matrix binds the reinforcement together and contributes to the distribution of applied loads. Examples of important matrix materials are polyesters, epoxies, polyimides and phenolics. Desirable reinforcement materials generally have high strength, high modulus, low weight, low cost, ease of fabrication and environmental resistance. Common materials having some or all of these properties and useful for fabricating reinforcements are glasses, polymers, ceramics, graphite, and carbon, each of which may be produced in many different forms. Widely used forms of reinforcements include continuous fibers or filaments, chopped fibers, mats, woven fibers, particles or ribbons.

Despite improvements in materials, attempts to construct and utilize flywheels which are able to withstand the stresses inherent in light weight energy storage systems have proven difficult. One partial solution has been the development of flywheels with a rim that offers an extremely high hoop strength and is able to withstand very high rotational speeds. For example, rims formed as an annulus made from unidirectional filamentary material in a matrix are well adapted to withstand the stresses imposed by centrifugal force at high rotational speeds. As is pointed out above, such flywheels conventionally have a hub including spokes coupling the rim to the shaft, but may also be designed without a hub or shaft.

Unfortunately, at the ultra high rotational speeds desired for a high-speed high-energy-density flywheel energy storage system, the rim of these flywheels tend to stretch and distort to expand radially. Even the unidirectional reinforcement materials embedded in the composite matrix is elastic and deforms when exposed to the intense centrifugal forces created by the high speed operation of the flywheel. Such designs present the difficult problem of how to prevent the composite rim from delaminating as it stretches and expands. The delamination of such a rim results in the rim dividing into separate radial portions due to the inability of the matrix material to sustain the applied radial stress.

SUMMARY OF THE INVENTION

Accordingly, it is an object of the present invention to provide a flywheel rotor which exhibits a reduced radial stress when compared with conventional flywheels.

It is another object of the present invention to provide a method of fabricating such a flywheel.

It is still another object of the present invention to provide a flywheel allowing increased rotational speeds and a correspondingly higher specific energy density.

These and other objectives are provided by the flywheel rotors of the present invention which, in a broad structural aspect, provides a high speed flywheel of the type having a composite annular rim which is supported for rotation about an axis perpendicular to the plane of the rim, the flywheel rim being fabricated of material having a radial gradient of circumferential elastic modulus which increases within the rim with increasing radial dimension outwardly from the axis of rotation, and this radial gradient of circumferential elastic modulus being achieved by a radial variation in the direction of a fibrous reinforcement portion of the composite material of the rim between the axial and circumferential directions.

According to another aspect, the present invention provides a method of making a high-speed composite flywheel of the type having an annular rim which is supported for rotation about an axis perpendicular to the plane of the rim, the method comprising the steps of fabricating the rim of a material having a radial gradient of circumferential elastic modulus which increases within the rim with increasing radial dimension outwardly from said axis of rotation, and achieving this radial gradient of circumferential elastic modulus by radial variation between the axial and circumferential directions of a fibrous reinforcement of said composite flywheel rim.

The additional steps of forming the rim to include at least two radially nested composite rim portions; fabricating an outer one of the at least two nested rim portions of a material having a selected first circumferential elastic modulus; fabricating a next radially inner one of the at least two nested rim portions of a material having a selected second circumferential elastic modulus which is lower than the first circumferential elastic modulus; defining a circumferentially and axially extending radial interface between the first and second rim portions; and transferring radial force between the first and second rim portions at the radial interface therebetween during operation of the flywheel may be used to realize a flywheel according to the present invention.

By taking advantage of the elastic properties of the materials used to form the flywheel, the flywheel of the present invention may be subjected to higher rotational speeds and corresponding higher energy storage without failure. Moreover, these higher speeds provide a substantially higher specific energy density to be obtained, thereby allowing the use of a less massive flywheel to achieve the same energy storage capacity as conventional flywheel rotors.

It will be appreciated by those skilled in the art that the flywheel rotors of the present invention may be formed using materials commonly used to fabricate flywheels. In particular, various composite materials including epoxy based systems may be used to the present flywheel in accordance with the teachings herein. Due to the relatively simple architecture of the flywheel of the present invention, wet lay-up, fiber winding, and other composite fabrication techniques which are fast, simple and readily accomplished without a heavy expenditure of labor, may be used to fabricate the present flywheel. In addition to the use of resin-based composite materials, ceramics and ceramic-based materials may also be used to fabricate a flywheel according to the present invention. Of course, a flywheel embodying the teachings and principles of the present invention may also be formed using more conventional metallic alloys or metals such as titanium, steel and aluminum. In each case, the elastic properties and tensile strength of the proposed fabrication material is taken into account to calculate the proportions of the flywheel.

Other objects, features and advantages of the present invention will be apparent to those skilled in the art from a consideration of the following detailed description of preferred exemplary embodiments thereof taken in conjunction with the associated Figures which will first be described briefly.

BRIEF DESCRIPTION OF THE DRAWINGS

FIG. 1 provides a perspective view of a flywheel embodying the present invention, with a portion of the flywheel within a referenced encirclement broken away and removed to better illustrate salient features of construction;

FIG. 2 is a fragmentary cross-section view of the flywheel taken along line 2—2 of FIG. 1;

FIGS. 3a and 3b provide enlarged and somewhat diagrammatic representations of a portion of the flywheel seen within the encircled and broken away part of FIG. 1;

FIGS. 4a and 4b are graphical representations of respective radial and tangential (hoop) stress levels within a flywheel according to the present invention and within a conventional flywheel of like dimensions; and FIG. 5 is a graphical representation of the improvement in maximum permissible rotational speed with variation in the percentage of circumferential fibers in a flywheel rim according to the present invention.

DETAILED DESCRIPTION OF PREFERRED EXEMPLARY EMBODIMENTS OF THE INVENTION

FIG. 1 shows a flywheel 10 having an axially-extending annular composite rim portion 12 which is comparatively thin in the radial direction, and a shaft portion 14. As mentioned above, not all flywheel designs will include a shaft or a hub. However, in order to present a complete and operative embodiment of the present invention, FIG. 1 depicts a conventional flywheel design with both a shaft and a hub. Those ordinarily skilled in the pertinent arts will realize that the invention is not limited to such a conventional flywheel with a shaft or a hub. The shaft portion 14 includes an axially opposite pair of journal parts 16 (only one of which is visible in the drawing Figures), at which the flywheel 10 may be rotationally supported in low-friction bearings. Between the pair of journal parts 16, the shaft portion 14 outwardly defines an elongate hexagonal portion 18, only a small end portion of which is visible in FIG. 1. This hexagonal portion 18 of the shaft 14 defines six axially elongate faces. The shaft portion 14 may be fabricated of a metallic material such as aluminum or titanium.

Extending outwardly from and covering each one of the six axially-extending faces of the hexagonal portion 18 of the shaft 14 is a respective one of six solid bar-like composite spokes 20. These spokes have an axial dimension like that of the rim portion 12, and a tangential dimension matching that of the faces of the hexagonal portion 18 of the shaft 14. Consequently, these bar-like spokes 20 lie closely adjacent to one another and virtually intersect with one another at the surface of shaft 18 along axial lines parallel with the axial vertices of the hexagonal portion 18. The spokes 20 may be adhesively bonded to the shaft portion 14 at the axially and tangentially extending interface therebetween. At their outer ends, the spokes 20 define a radiused surface (not seen in the drawing figures) matching the inner surface 22 of the rim 12. The spokes 20 may be fabricated of prepreg material having all or a majority of the fibers therein oriented radially. That is, the majority of the fibers in the spokes 20 will be oriented along a line parallel with the length of the spokes and extending between the shaft 14 and rim 12. The prepreg material from which the spokes 20 are fabricated will include a conventional matrix material, such as a high-strength epoxy.

At the interface of the outer ends of the spokes 20 and inner surface 22 of the rim 12, an adhesive bond (indicated with the arrowed numeral 24) is formed. This adhesive bond unites the spokes 20 and rim 12. Consequently, the structure of flywheel 10 is able to sustain torque applied between shaft 14 and rim 12 to accelerate or decelerate the latter. Those ordinarily skilled in the pertinent arts will appreciate that acceleration of the flywheel represents storage of energy therein, while deceleration of the flywheel occurs when energy is withdrawn. Both the energy storage and energy withdrawal activities require that the structure of the flywheel 10 be able to sustain the effective torque. The flywheel 10 has an interface with a rotational power source and power receiver (not shown, but represented with the dashed line 26). The interface 26 allows the flywheel 10 to be incorporated into a practical flywheel energy storage system.

Closer examination of FIG. 1 will reveal that the composite flywheel rim 12 includes two distinct composite material rim portions referenced with the numerals 12a and 12b. These portions 12a and 12b define an interface therebetween, which is referenced with the numeral 12c. These composite material portions 12a, and 12b of the rim 12 may in fact be integral with one another in the sense that the matrix of the composite material is continuous throughout the rim 12. However, the portions 12a and 12b have distinctly different physical properties from one another. Thus, the portions 12a and 12b may be fabricated separately and then be bonded together, or may integral with one another with the differences in physical properties being implemented by a selected variation in the fabrication of these composite rim portions. Also, it will be understood that the embodiment of rim 12 having two composite portions is merely exemplary. A flywheel rim may be fabricated according to the teaching of the present invention with a plurality of rim portions sequentially arranged radially within the rim. Alternatively, a flywheel may be fabricated with a continuously variation in the physical properties of the rim according to the present invention such that a discernable line of demarcation between portions of the rim 12 having physical properties which are selected to be different than one another is avoided.

FIG. 2 shows that the portion 12a of the composite rim 12 includes matrix material 28 and reinforcement material 30. The fibers of the reinforcement material 30 extend substantially purely circumferentially in the portion 12a. This portion of the rim 12 may be laid up on a mandril or atop the portion 12b while the latter is supported on a mandril, for example. During lay up of the rim portion 12a, the fibers 30 will be laid down in plural parallel strands, for example, or one or a plurality of fibers may be wrapped and traversed across the axial dimension of the rim 12 with a very small helix angle. In this way, plural wraps of the one or more fibers will build up the required radial dimension for the rim 12, or for a particular portion of this rim. This build up of the rim portion 12 may involve use of conventional composite material construction techniques, such as use of prepreg mats or cloth, filament winding, and oven curing of the partially cured prepreg composite materials. Thus, the fibers 30 in the rim portion 12a may be considered to be substantially circumferential. As a result, the rim portion 12a has a modulus in the circumferential direction which is a function of the modulus of the fibers 30 themselves, and the percentage of these fibers 30 present in the matrix 28. In other words, the portion 12a of the rim 12 does not have its modulus in the circumferential direction reduced substantially by angulation of the fibers 30 relative to the circumferential direction. Those ordinarily skilled in the pertinent arts will realize that even a small angulation of the fibers of the reinforcement 30 relative to the circumferential direction has an effect reducing the elastic modulus of the rim portion 12a. However, the angulation of reinforcement fibers 30 in portion 12a is limited to about 5 degrees or less from the circumferential direction, so that the resulting reduction of elastic modulus is insignificant in the portion 12a. As will be seen, angulations of reinforcing fibers greater than 5 degrees can be used to effect a selective reduction in the circumferential elastic modulus of a portion of the rim 12.

The portion 12b of rim 12 includes matrix material 28' and reinforcement material 30'. As was mentioned, the matrix material 28 and 28' may be continuous throughout the rim 12. However, in contrast to the rim portion 12a, in the rim portion 12b either a selected percentage (which is less than 100%) of the reinforcement material 30' in rim portion 12b extends substantially in the circumferential direction with the remainder of the reinforcing fibers having a selected angulation relative to the circumferential, or all of the reinforcement fibers 30 have selectively varying angulations with respect to the circumferential direction. FIGS. 3a and 3b illustrate alternative embodiments of the present invention which differ from one another only in the way in which the percentage of fiber reinforcement material 30 which does not extend substantially in the circumferential direction is achieved in the rim portion 12b. FIGS. 3a and 3b are enlarged and somewhat diagrammatic representations of the structure of rim portion 12b which would be seen if the outer rim portion 12a were broken away, as is depicted in FIG. 1, and then the inner rim portion 12b were peeled apart to show its layered structure.

FIG. 3a shows a rim portion 12a in which successive layers 32, 34, 36, 38, etc, of the filamentary reinforcement material 30' in rim portion 12b are illustrated. The rim portion 12b will have many such layers of filamentary reinforcement material 30', but the four layers of such material illustrated in FIG. 3a suffice to show the structure of this rim portion. FIG. 3a shows that alternating layers of the reinforcement material 30' in rim portion 12b are arranged to be substantially purely axial and substantially circumferential. That is, the layers of reinforcement fibers 30 which are substantially circumferential include fibers which are purely circumferential or which vary from the circumferential direction (for example, because of helical winding of the fibers with a shallow helix angle) by no more than about 5 degrees. These sequential alternating layers of filamentary reinforcement material 30' may be provided by using alternating plies of prepreg material with parallel filaments arranged axially and circumferentially, respectively, of the rim portion 12b. When the composite material of the rim 12 is cured, the matrix 28' will become unitary within the rim, while the reinforcement material 30' will be arranged as illustrated. Consequently, the rim portion 12b has a considerably lower modulus in the circumferential direction than does the portion 12a because the fibers in the axially-extending layers of portion 12b do not sustain any of the circumferential hoop stress.

FIG. 3b shows an alternative structure for the rim portion 12b in which alternating layers 32', 34', 36', 38', etc, of the reinforcement material of rim portion 12b are arranged substantially circumferentially. That is, the layers 34' and 38' are just like layers 34 and 38 of the embodiment of FIG. 3a. However, the layers 32' and 36' are laid up with a helix angle so that the fibers traverse across the axial dimension of the rim 12. This allows the layers 32' and 36' to be laid up by traverse winding a continuous filament or plurality of filaments on the rim portion 12b as it is supported on a mandrel, for example. Again, the rim portion 12b fabricated according to the teaching of FIG. 3b will have a substantially lower modulus in the circumferential direction than does the rim portion 12a.

Still alternatively, those ordinarily skilled in the pertinent arts will recognize that the layer 12b can be helically wound like the layer 12a, but using a helix angle in layer 12b which is fixed or selectively varied and is greater than about 5 degrees. In the layer 12a, as before, the filaments of reinforcement 30 will extend purely circumferentially, or will extend substantially circumferentially with a helix angle of no more than about 5 degrees. This alternative embodiment of the flywheel would appear just like that of FIG. 1, and would probably not have a visible line of demarkation between the rim portions 12a and 12b.

FIGS. 4a and 4b graphically illustrate a comparison of the radial and hoop stresses in a flywheel rim with a radial gradient or gradation in its circumferential elastic modulus according to the present invention, in comparison to the stress values experienced in a conventional flywheel rim with a radially constant circumferential elastic modulus. Viewing FIG. 4a, a line 40 depicts the radial stress curve within a conventional flywheel rim as a function of radial position within the rim. A line 42 shows the correspondingly lower radial stress experienced within a flywheel rim according to the present invention. It will be noted that a cusp 44 on the radial stress line 42 represents the interface between rim portions 12a radially outwardly of this cusp, and portion 12b radially inwardly of the cusp. A flywheel with more that two rim portions would display a corresponding number of cusps along the radial stress curve (i.e., a number of cusps which is one less than the number of rim portions). On the other hand, a flywheel rim according to the present invention with a radial gradient of circumferential elastic modulus which is achieved by continuous variation of the modulus (as opposed to step-wise variation of the modulus) will show a radial stress curve also lower than the conventional flywheel but without cusps.

FIG. 4b shows with a line 46 the circumferential hoop stress experienced in a conventional flywheel rim. A line 48 shows that a somewhat higher circumferential hoop stress is experienced within a flywheel rim according to the present invention. However, this level of hoop stress is within the capabilities of known composite materials to safely endure. A cusp 50 illustrates again that a change in the stress curve is experienced at the interface of the inner rim portion 12b and the outer rim portion 12a. In this case, the hoop stress curve 48 drops precipitously radially inwardly of the cusp 50 because the material of rim portion 12b is weaker in circumferential modulus and stretches more than does rim portion 12a in response to the applied level of circumferential hoop stress. To the left of the cusp 50 on FIG. 4b (that is, radially inwardly of the interface between portions 12a and 12b), the hoop stress curve 48 continues to increase radially inwardly toward the inner surface 22 of the rim 12.

FIG. 5 illustrates the permissible improvement in maximum rotational speed for a flywheel according to the present invention with variation in the percentage of substantially circumferential fibers in the inner portion 12b of the flywheel rim. That is, FIG. 5 uses the average of substantially circumferential fibers in the inner rim portion 12b as an independent variable, recognizing that the outer most portion of a two-portion rim (or of a multi-portion rim) will have 100% of its fibers preferably oriented substantially circumferentially. FIG. 5 shows that the best improvement in rotational speed for a flywheel with a rim having two portions, as is depicted in FIG. 1, is achieved with about 75% of the inner rim portion 12b being formed by composite material with substantially circumferential fiber reinforcement.

However, the advantages of the present invention are believed to be enjoyed with a flywheel rim having a radial gradient of circumferential elastic modulus regardless of the percentage variation of substantially circumferentially extending reinforcement which is used in the composite matrix. It follows, that the percentage of reinforcement of the flywheel rim which should extend in the substantially circumferential direction may vary from about 50 percent to about 95 percent, with considerable latitude for design selection within this range. In the present exemplary embodiment of a two-portion rim, the portion 12b is about one-fifth of the thickness of rim 12. A flywheel with a rim according to the preferred exemplary embodiment illustrated herein is expected to achieve an increase in permissible operating speed of 6.6%, with an attendant improvement of energy storage capacity of 13.6%.

Those skilled in the art will further appreciate that the present invention may be embodied in other specific forms without departing from the spirit or central attributes of the present invention. Because the foregoing description of the present invention discloses only exemplary embodiments, it is to be understood that other variations are recognized as being within the scope of the present invention. Accordingly, the present invention is not limited to the particular embodiments which have been described in detail herein. Rather, reference should be made to the appended claims to define the scope and content of the present invention.

I claim:

1. A high speed flywheel, comprising:

a circular flywheel rim having an axis of rotation which is central to said flywheel rim and perpendicular to a plane of said circular flywheel rim, said flywheel rim being fabricated of composite material having both a matrix material and at least one reinforcement fiber extending circumferentially in said matrix material; said at least one reinforcement fiber providing a total fiber content for said flywheel rim; at least one elongate part of said reinforcement fiber extending substantially in a true circumferential direction in said flywheel rim with a deviation of said one elongate part of said reinforcement fiber from said true circumferential direction of said flywheel rim being no more than about 5°; and another elongate part of said reinforcement fiber being angulated relative to said true circumferential direction of said flywheel rim at an angle that exceeds about 5°; said flywheel rim having a radial gradient of circumferential elastic modulus which increases within said flywheel rim with increasing radial dimension outwardly from said axis of rotation by selected radial variation of a variable selected from the group consisting of:

the percentage which said another elongate part of said reinforcement fiber bears to said total fiber content of said flywheel rim;

the angulation of said another elongate part of said reinforcement fiber relative to said true circumferential direction of said flywheel rim; and both the percentage which said another elongate reinforcement fiber part bears to said total fiber content of said flywheel rim, and the angulation of said another elongate reinforcement fiber part relative to said true circumferential direction of said flywheel rim.

2. The high speed flywheel of claim 1 wherein said flywheel rim includes at least two radially nested rim portions, an outer one of said at least two radially nested rim portions being fabricated of a composite material having a selected first circumferential elastic modulus, and a next radially inner one of said at least two radially nested rim portions being fabricated of a composite material having a selected second circumferential elastic modulus which is lower than said first circumferential elastic modulus, and said two radially nested rim portions defining a circumferential and axially extending interface at which radial force is transferred radially outwardly between said rim portions during operation of said flywheel.

3. The high speed flywheel of claim 2 wherein said outer one of said two radially nested rim portions is fabricated of composite material having said at least one reinforcement fiber extending substantially in said true circumferential direction.

4. The high speed flywheel of claim 3 wherein said next radially inner one of said at least two radially nested rim portions has a selected percentage of said at least one reinforcement fiber extending substantially in said true circumferential direction; and a complementary percentage of said at least one reinforcement fiber extending at a selected angle to said true circumferential direction of said rim.

5. The high speed flywheel of claim 4 wherein said flywheel rim has a certain percentage of said at least one reinforcement fiber extending substantially in said true circumferential direction, said certain percentage being in the range from about 50 percent to about 95 percent of said total fiber content.

6. The high speed flywheel of claim 5 wherein said next radially inner one of said rim portions has a selected percentage of said at least one reinforcement fiber extending substantially in said true circumferential direction, said selected percentage being substantially 75 percent.

7. The high speed flywheel of claim 3 wherein said matrix material is continuous throughout said flywheel rim.

8. The high speed flywheel of claim 4 wherein said selected angle is less than 90 degrees and is greater than about 5 degrees.

9. The high speed flywheel of claim 4 wherein said selected angle is greater than about 5 degrees and is selectively varied radially within said next radially inner one of said two radially nested rim portions.

10. A high speed flywheel, comprising:

a flywheel rim being generally circular in a plane and being fabricated of composite material having both a matrix material and at least one reinforcement fiber extending circumferentially in said matrix material to provide a total fiber content for said flywheel rim; at least one elongate part of said reinforcement fiber extending substantially in a true circumferential direction in said flywheel rim with a deviation of said one elongate part of said reinforcement fiber from said true circumferential direction of said flywheel rim being no more than about 5°; and another elongate part of said reinforcement fiber being angulated relative to said true circumferential direction of said flywheel rim at an angle that exceeds about 5°; said flywheel rim having a radial gradient of circumferential elastic modulus which increases within said flywheel rim with increasing radial dimension outwardly from said axis of rotation by selected radial variation of a variable selected from the group consisting of:

the percentage which said another elongate part of said reinforcement fiber bears to said total fiber content of said flywheel rim;

the angulation of said another elongate part of said reinforcement fiber relative to said true circumferential direction of said flywheel rim; and both the percentage which said another elongate reinforcement fiber part bears to said total fiber content of said flywheel rim, and the angulation of said another elongate reinforcement fiber part relative to said true circumferential direction of said flywheel rim;

wherein said flywheel rim includes at least two radially nested rim portions, an outer one of said at least two radially nested rim portions being fabricated of a composite material having a selected first circumferential elastic modulus, and a next radially inner one of said at least two radially nested rim portions being fabricated of a composite material having a selected second circumferential elastic modulus which is lower than said first circumferential elastic modulus, and said two radially nested rim portions defining a circumferential and axially extending interface at which radial force is transferred radially outwardly between said rim portions during operation of said flywheel;

wherein said outer one of said two radially nested rim portions is fabricated of composite material having said reinforcement fiber extending substantially in said true circumferential direction;

wherein a said next radially inner one of said two radially nested rim portions has a selected percentage of said reinforcement fiber extending substantially in said true circumferential direction and a complementary percentage of said reinforcement fiber extending at a selected angle to said true circumferential direction of said flywheel rim; and wherein said selected angle is substantially 90 degrees and is constant throughout said next radially inner one of said two radially nested rim portions.

11. A high speed flywheel, comprising:

a composite annular flywheel rim including a fiber reinforcement material embedded in a matrix material, said flywheel rim including a radially outer circumferential rim portion which has said fiber reinforcement material extending substantially circumferentially at an angle to a true circumferential direction; said angle being generally in the range from about zero degrees to no more than about 5 degrees and said fiber reinforcement material providing in said radially outer rim portion a resulting selected first circumferential elastic modulus; and said flywheel rim including another circumferential rim portion disposed radially inwardly of said radially outer circumferential rim portion, said another circumferential rim portion having a selected percentage of said fiber reinforcement material extending circumferentially at a selected angle to said true circumferential direction, said selected angle being generally in the range from about 90 degrees to not less than about 5 degrees, and said fiber reinforcement material providing in said another circumferential rim portion a resulting selected second circumferential elastic modulus, said second circumferential elastic modulus being less than said first circumferential elastic modulus.

12. A high speed flywheel, comprising:

said composite annular flywheel rim including a fiber reinforcement material embedded in a matrix material, said flywheel rim including a radially outer circumferential rim portion which has said fiber reinforcement material extending substantially circumferentially at an angle to a true circumferential direction generally in the range from about zero degrees to no more than about 5 degrees and a resulting selected first circumferential elastic modulus; and said flywheel rim including another circumferential rim portion disposed radially inwardly of said radially outer circumferential rim portion, said another circumferential rim portion having a selected percentage of said fiber reinforcement material extending circumferentially at a selected angle to said true circumferential direction, said selected angle being generally in the range from about 90 degrees to not less than about 5 degrees and a resulting selected second circumferential elastic modulus, said second circumferential elastic modulus being less than said first circumferential elastic modulus;

said radially outer circumferential rim portion being fabricated of composite material having substantially all reinforcement fibers therein extending substantially in said true circumferential direction to provide said first circumferential elastic modulus, and said another circumferential rim portion having a fraction of said fiber reinforcement material therein extending angularly with respect to said true circumferential direction of said flywheel rim to provide said second circumferential elastic modulus.

13. The high speed flywheel of claim 12 wherein said selected percentage is in the range from about 50 percent to about 95 percent.

14. The high speed flywheel of claim 13 wherein said selected percentage is substantially equal to 75 percent.

15. The high speed flywheel of claim 13 wherein said selected percentage is selectively varied radially throughout said another circumferential rim portion.

16. The high speed flywheel of claim 12 wherein said matrix material is continuous throughout said flywheel rim.

* * * * *